United States Patent [19]
Ehrlich

[11] 3,841,661
[45] Oct. 15, 1974

[54] CARGO TRANSPORTER HAVING DOOR-OPERATED CARGO RETAINER

[75] Inventor: Donald J. Ehrlich, Monon, Ind.

[73] Assignee: Monon Trailer, Inc., Monon, Ind.

[22] Filed: May 23, 1973

[21] Appl. No.: 363,093

[52] U.S. Cl............................................. 280/179 R
[51] Int. Cl............................................. B60p 7/00
[58] Field of Search...... 296/50, 106; 160/201, 112; 280/107, 179; 105/376, 369 BA, 378, 369 B

[56] References Cited
UNITED STATES PATENTS

| | | | |
|---|---|---|---|
| 2,525,309 | 10/1950 | Norberg | 160/201 X |
| 3,164,395 | 1/1965 | Burch et al. | 280/179 R |
| 3,747,954 | 7/1973 | Enochian | 280/179 R |

*Primary Examiner*—Stanely H. Tollberg
*Assistant Examiner*—Stanley H. Tollberg
*Attorney, Agent, or Firm*—Olson, Trexler, Wolters, Bushnell & Fosse, Ltd.

[57] ABSTRACT

A cargo transporter comprises a body with a cargo space and a trackway mounted, articulated, sliding door for the loading and unloading opening into the cargo space. A flexible, water impervious cargo retainer is attached to the door and to a carrier that is movable on an overhead part of the trackway. The arrangement is such that when the door is closed, the retainer is automatically positioned in a manner to prevent shifting of the cargo into the travel area of the door. When the door is raised from its closed position to its open or overhead position, the retainer underlies the door. In either the closed or open position of the door, the retainer protects the cargo from moisture coming through the door.

8 Claims, 3 Drawing Figures

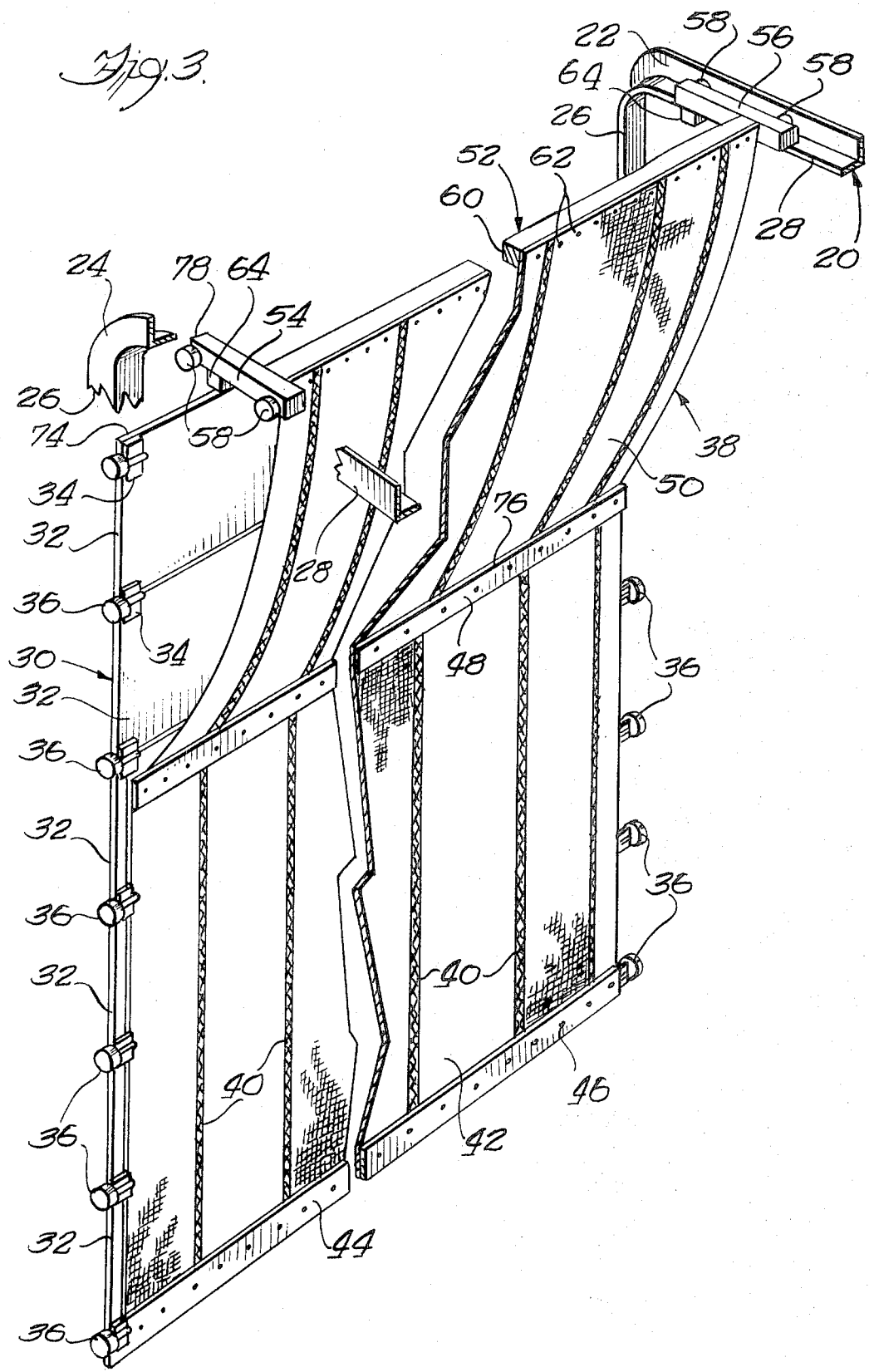

CARGO TRANSPORTER HAVING DOOR-OPERATED CARGO RETAINER

BACKGROUND OF THE INVENTION

This invention relates to improvements in cargo transporters, such as trailers and the like, and is particularly concerned with the provision of an improved arrangement for preventing freight from jamming the door of the cargo transporter which is disposed over the loading and unloading opening into the cargo space.

In semi-trailers and like cargo transporters of the type having an upward acting or overhead type of sliding door, there is a problem during transit in preventing freight from shifting into the normal path of movement of the door to and from its closed and open positions. It will be appreciated that when the freight does shift into the path of movement of the door, the door becomes jammed. Under such circumstances considerable force must often be used to open the door, and in some cases forcing the door may result in damage to the cargo. Previous attempts to solve this problem have involved the use of chains or other devices to "tie off" the load. Such devices are often of limited value since the devices themselves are placed in or at the door opening, and in addition it is necessary to fasten and unfasten these devices manually (i.e., they are not automatic) upon loading or unloading of cargo, as the case may be. Furthermore, such devices have not been found to be entirely effective due to the fact that there are a multitude of sizes of cargo containers that are in use today, and it becomes difficult with such devices to provide proper retention of all sizes of containers.

A further problem in connection with overhead types of sliding doors lies in the fact that because these doors are made of a number of hingedly joined flat panels, water can come through the joints between the panels resulting in damage to freight that is adjacent to the door. This can occur not only when the door is closed but also when it is open. For example, if the door is extremely wet and is raised to its open position the door will be in a horizontal position above freight. Water on the door can then seep downwardly through the joints between the door sections.

OBJECTS AND SUMMARY OF THE INVENTION

It is an object of this invention to provide a cargo transporter embodying a cargo retainer that serves to restrain cargo from jamming against the door during transit.

It is a further object of this invention to provide a cargo transporter in which the cargo retainer is automatically positioned in its proper place upon closing of the door.

It is an additional and important object of this invention to provide a cargo carrier embodying a cargo retainer of the type stated that protects the load from water coming through the door when the door is either in its open position or in its closed position.

In accordance with the foregoing objects the invention comprises a cargo transporter having a body with a cargo space and a door for the loading and unloading opening into the cargo space. The door is movably mounted on a trackway which runs vertically at the sides of the opening and also horizontally over the cargo space just under the roof of the transporter. A cargo retainer is attached to the door and to a carrier that is movably mounted on the overhead or horizontal part of the trackway, the arrangement being such that when the door is closed the cargo retainer will automatically provide a barrier that prevents encroachment of the cargo into the door travel area.

The cargo retainer is preferably a flexible sheet of water impervious or water resistant material. A first part or length of the cargo retainer is secured flush with the inside of the door over the joints between a number of the hingedly connected door sections. When the door is in its closed position a second part of the retainer extends upwardly and at an angle to the door for connection to the carrier on the overhead part of the trackway to form the cargo barrier. The retainer in this position forms not only a cargo barrier but also a water barrier to protect the freight. This second part of the carrier is dimensioned such that when the door is opened (e.g., horizontal and overhead), said second part lies generally flat under the door to serve as a barrier to prevent water from leaking downwardly through the joints of the door.

BRIEF DESCRIPTION OF THE FIGURES

FIG. 3 is a fragmentary perspective view showing the door, the cargo retainer, and related structure which make up parts of the present invention.

DETAILED DESCRIPTION

Figure 1:
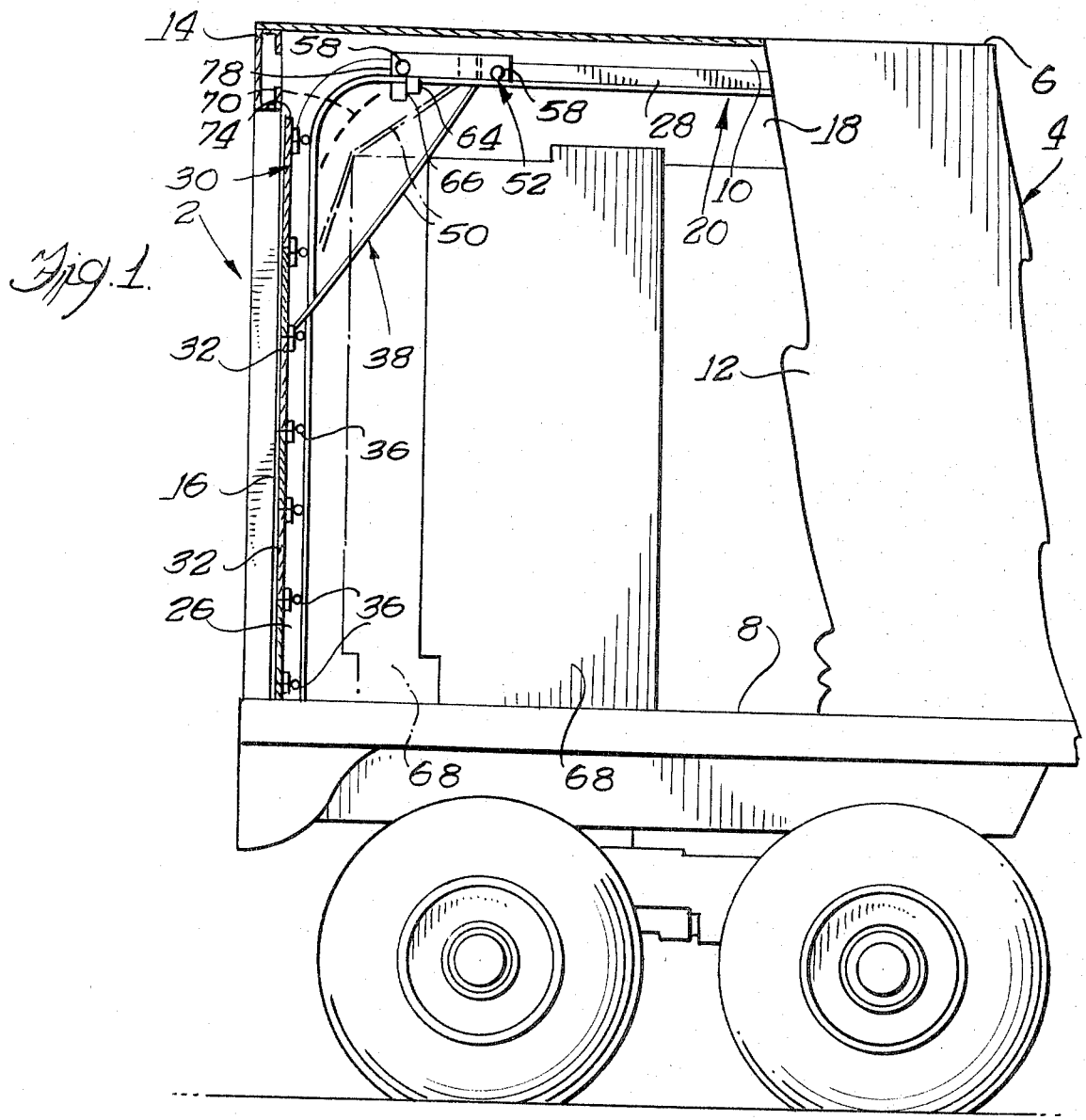
FIG. 1 is a side elevational view, partially broken away and in section, of a cargo transporter constructed in accordance with and embodying the present invention, and showing the door in its closed position and the cargo retainer in position to prevent cargo from entering a prohibited space.
Figure 2:
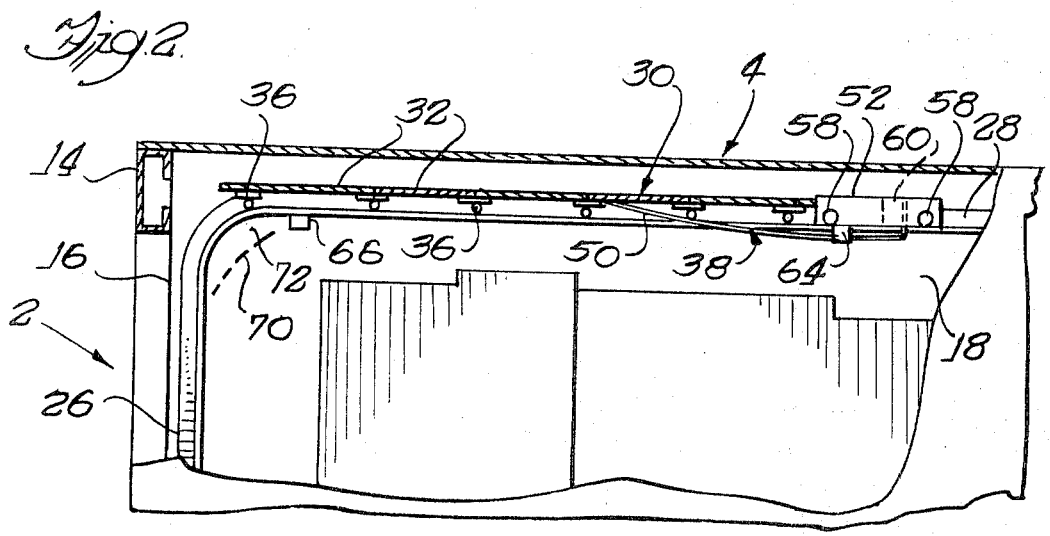
FIG. 2 is an elevational view, partially in section, similar to FIG. 1 and showing the door in its open position.

Referring now in more detail to the drawing there is shown a cargo transporter in the form of a semi-trailer 2, the rear portion of which is shown in FIGS. 1 and 2. The semi-trailer is a wheeled vehicle that comprises a generally rectilinear body 4 which includes a roof 6, a bed or floor 8 and opposed sides 10, 12. The rear of the body 4 includes a top header 14 which, together with the sides 10, 12 and floor 8, define a loading and unloading opening 16 into a cargo space 18 within the body 4.

Positioned at the opening 16 and also overhead of the cargo space 18 is a trackway 20 that is rigidly supported relative to the body 4 in a conventional manner. The trackway 20 includes parallel rails 22, 24 at the sides of the body 4, the rails including vertical portions 26, 26 at the opening 16 and horizontal overhead portions 28, 28 just below the top 6 and overlying the cargo space 18. Supported on the trackway 20 is an articulated door 30 that is formed by a number of door sections or panels 32 that are respectively secured together by hinges 34. At or aligned with the hinge pins of the hinges 34 are rollers 36 which roll on the rails 22, 24 whereby the door 30 can be shifted along the angularly related horizontal and vertical rail portions 26, 26, 28, 28 of the trackway 20. When the door 30 is in the horizontal position namely on the overhead or horizontal portion of the trackway, as shown in FIG. 2, cargo may be loaded or unloaded through the opening 16. When the door is in its closed position across the opening 16, as shown in FIG. 1, the door 30 is vertically disposed along the vertical portion 26, 26 of the trackway 20.

Provided for cooperation with the door 30 and the trackway 20 is a cargo retainer 38 of water impervious or water resistant material. The cargo retainer can be made of a suitable fabric that is reinforced with cables or belts 40. As best seen in FIG. 3, the lower section or part 42 of the cargo retainer 38 is disposed against and substantially covers the inside surface of the lower part of the door 30. In the example shown, this lower part of the door is a major portion of the door. To secure the retainer 38 a strip 44 may be positioned over the lower margin of the retainer part 42 at the base or foot of the door. Nails 46 or like fasteners may be inserted through the strip 44 and into the bottom door section, whereby one end of the retainer is firmly fastened to the bottom of the door 30. Upwardly a number of panels 32 from the bottom door panel the cargo retainer 38 may again be nailed or otherwise secured to one of the door panels through a strip 48, also as best seen in FIG. 3.

When the door is in its closed position, as shown in FIGS. 1 and 3, an upper part or section 50 of the cargo retainer 38, beginning at the strip 48, angles upwardly and away from the upper part of the door for connection to a carrier 52 that rides in the overhead portion of the trackway 20. The retainer section 50 may have some slack, as shown. The carrier 52 comprises opposed roller supports 54, 56 that journal rollers 58, 58, 58, 58 which ride along the respective horizontal rail portion 28, 28. Extending between the roller supports 54, 56 is a cross bar 60 to which the upper end of the cargo retainer section 50 is secured as by nails 62 or other suitable fasteners.

Mounted on the roller supports 54, 56 are depending stops 64. These stops 64 are adapted to abut carrier stops 66 that are fixed on the respective upper rail portions 28, 28. This engagement of the stops 64, 66 limits the amount of rearward movement of the carrier 52 when the door is in its closed position, as shown in FIG. 1.

With continued reference to FIG. 1, it will be seen that the section 50 of the cargo retainer 58 provides a barrier for the rearward shifting of cargo 68 within the cargo space 18. It will be noted from FIGS. 1 and 2 that there is a dotted line 70 that is inwardly of the trackway and defines a boundary which at least in part is spaced from the door 30 when the latter is in its closed position. Viewed another way, this boundary 70 together with the adjacent part of the trackway, defines a door travel area 72 where cargo cannot be positioned because the positioning of cargo in the area 72 would prevent free movement of the door to and from its open and closed positions. By the same token, the cargo must be prevented, during transit, from shifting rearwardly past the boundary 70 and into the area 72. The section 50 of the cargo retainer 38 prevents this from happening, as shown in FIG. 1, wherein the cargo 68 has shifted rearwardly to the broken line position. The cargo retainer can flex to the extent necessary to be free of slack, as shown also in broken lines, but any further movement of the cargo 68 is restrained, whereby the cargo 68 does not reach the boundary 70.

When the door is opened, as shown in FIG. 2, the cargo retainer 38 underlies the door in a substantially flat condition so as to provide a barrier against water which may be on the outside of the door and which might otherwise drop onto the cargo 68.

When the door is raised initially, the carrier 52 does not move. However, it is seen that the door is in lost-motion connection with the carrier so that when the top edge 74 of the door strikes the roller supports 54, 56, the carrier is then moved forwardly with the door and continues movement therewith until the door reaches the position shown in FIG. 2. To assure that the cargo retainer section 50 is approximately flat when in the position shown in FIG. 2, it is made of a length that is approximately equal to the distance between the upper door edge 74 and the upper edge 76 of the strip 48 (FIG. 3) plus the distance between the forward edge of the cross bar 60 (at which the section 50 is secured) and the rear edges 78 of the roller supports 54, 56.

It will be apparent that cargo is loaded through the opening 16 when the door is in the position shown in FIG. 2. Care is taken to see that the cargo is not positioned within the prohibited area 72. Once the cargo is loaded the door is moved to the position shown in FIG. 1. Initial movement of the door pulls the carrier 52 until the carrier 52 abuts the stops 66. Further movement of the door downwardly to its closed position automatically places the cargo retainer in its proper position for preventing cargo from entering the area 72.

The invention is claimed as follows:

1. A cargo transporter having a body with a cargo space, means defining an opening into said cargo space, a door for said opening, said door being movable to and from a closed generally vertical position across said opening to an open generally horizontal position, said door having a plurality of hinged together sections, trackway means movably mounting said door sections, said door defining a boundary in said cargo space along which the door moves during opening and closing thereof, which boundary is at least in part spaced from the door when the door is in its closed position, a cargo retainer extending across at least a substantial portion of the width of the door, and means securing said cargo retainer in a cargo-retaining position in said cargo space to prevent cargo in the cargo space from encroaching said boundary when the door is in its closed position and operable upon moving said door from its closed position to its open position for shifting said cargo retainer out of cargo retaining position to a position over said cargo space.

2. A cargo transporter according to claim 1 in which said securing means includes carrier means movable in said trackway means for movably supporting an end of said cargo retainer, another end of said cargo retainer being secured to said door.

3. A cargo transporter according to claim 2 in which said cargo retainer is a flexible member, and said carrier means is in lost-motion connection with said door such that the door moves part way from its closed position to its open position and then engages said carrier means for movement thereof.

4. A cargo transporter according to claim 1 in which a part of said cargo retainer extends over the inside of the door to span the space between some of the door sections when the door is in either position, and another part of said cargo retainer extends at a substantial angle to others of said door sections when the door is closed but underlies said other sections when the door is open.

5. A cargo transporter having a body with a cargo space, means defining an opening into said cargo space, a door, means having a first portion for supporting the door in a closed position across said opening and a second portion for supporting said door remote from said opening, said door being mounted on said means for movement to and from said open and closed positions, a cargo retainer extending across at least a substantial portion of the width of the door, and means mounting said cargo retainer for movement relative to said door such that said movement of said door to its open position automatically places said cargo retainer in a non-obstructing position for loading and unloading cargo through said opening and movement of said door to its closed position automatically places said cargo retainer in a position across a part of said cargo space to define a barrier preventing cargo in the cargo space from entering a predetermined region inwardly of the door, which region is defined in part by the path of movement of the door between its closed position and its open position.

6. A cargo transporter according to claim 5 in which said means mounting the cargo retainer includes a carrier movable on said second portion, and said cargo retainer is mounted on said door and on said carrier.

7. A cargo transporter according to claim 6 in which said cargo retainer is interposed between said door and said cargo space when the door is in its either position to provide a barrier inhibiting the entrance of water into the cargo space.

8. A cargo transporter according to claim 6 in which said first and second portions are trackway portions that are angularly related, said door is formed of a plurality of hingedly connected sections, and said cargo retainer is a flexible sheet that substantially spans the space between said trackway portions.

* * * * *